United States Patent [19]

Yoshida et al.

[11] Patent Number: 5,012,461
[45] Date of Patent: Apr. 30, 1991

[54] DISK RECORDING APPARATUS FOR RE-ESTABLISHING A RECORDING MODE AT A DESIRED ADDRESS

[75] Inventors: Tadao Yoshida, Kanagawa; Ryo Ando, Tokyo, both of Japan

[73] Assignee: Sony Corporation, Tokyo, Japan

[21] Appl. No.: 273,335

[22] PCT Filed: Feb. 24, 1988

[86] PCT No.: PCT/JP88/00196

§ 371 Date: Oct. 21, 1988

§ 102(e) Date: Oct. 21, 1988

[87] PCT Pub. No.: WO88/06785

PCT Pub. Date: Sep. 7, 1988

[30] Foreign Application Priority Data

Feb. 27, 1987 [JP] Japan .................................. 62-44825

[51] Int. Cl.⁵ ............................................... G11B 7/00
[52] U.S. Cl. .................................... 369/44.33; 369/32; 369/116
[58] Field of Search ................... 369/32, 44.28, 44.31, 369/44.33, 44.38, 116

[56] References Cited

U.S. PATENT DOCUMENTS

| | | | |
|---|---|---|---|
| 4,138,663 | 2/1979 | Lehureau et al. | 369/44.28 |
| 4,484,319 | 11/1984 | Koishi et al. | 369/44.28 |
| 4,554,652 | 11/1985 | Maeda et al. | 369/44.33 |
| 4,679,256 | 9/1987 | Shinkai | 369/44.28 |
| 4,759,006 | 7/1988 | Koishi et al. | 369/44.28 |
| 4,819,219 | 4/1989 | Nagano | 369/44.28 |
| 4,839,876 | 6/1989 | Fennema | 369/44.28 |
| 4,858,214 | 8/1989 | Baba | 369/44.28 |

*Primary Examiner*—Donald McElheny, Jr.
*Attorney, Agent, or Firm*—Alvin Sinderbrand; William S. Frommer

[57] ABSTRACT

A disk recording apparatus for recording data such as information concerning a musical performance on a recording disk (1) to which absolute addresses have been imparted in advance. Vibration during the recording operation and unexpected track jumping due to defects in the recording disk are detected relying upon the discontinuity of absolute addresses reproduced from the recording disk (1). In case track jumping has taken place, the laser power of the optical head (12) is dropped to the reproduction level and the track jump control is actuated to access a desired track. The recording operation is then resumed for the track.

4 Claims, 6 Drawing Sheets

DISK RECORDING APPARATUS FOR RE-ESTABLISHING A RECORDING MODE AT A DESIRED ADDRESS

TECHNICAL FIELD

This invention relates to a disk recording apparatus for recording data such as the performance information on a recordable disk to which absolute addresses have been imparted in advance. It is applicable for instance to a performance device for a compact disk (CD) adapted for both recording and reproduction.

BACKGROUND ART

There has so far been marketed a disk player device dedicated to reproduction, such as a CD player designed to reproduce a so-called compact disk (CD), which is an optical disk on which audio signals such as voice or musical sounds are recorded in digitized form. While the conventional CD player is dedicated to reproduction, attempts have been made to develop a disk system which, through the use of a magneto-optical disk formed by a photo-magnetic recording medium allowing rewriting of information, is adapted for both recording and reproduction and able to maintain superior compatibility with respect to the compact disk.

Figure 1:
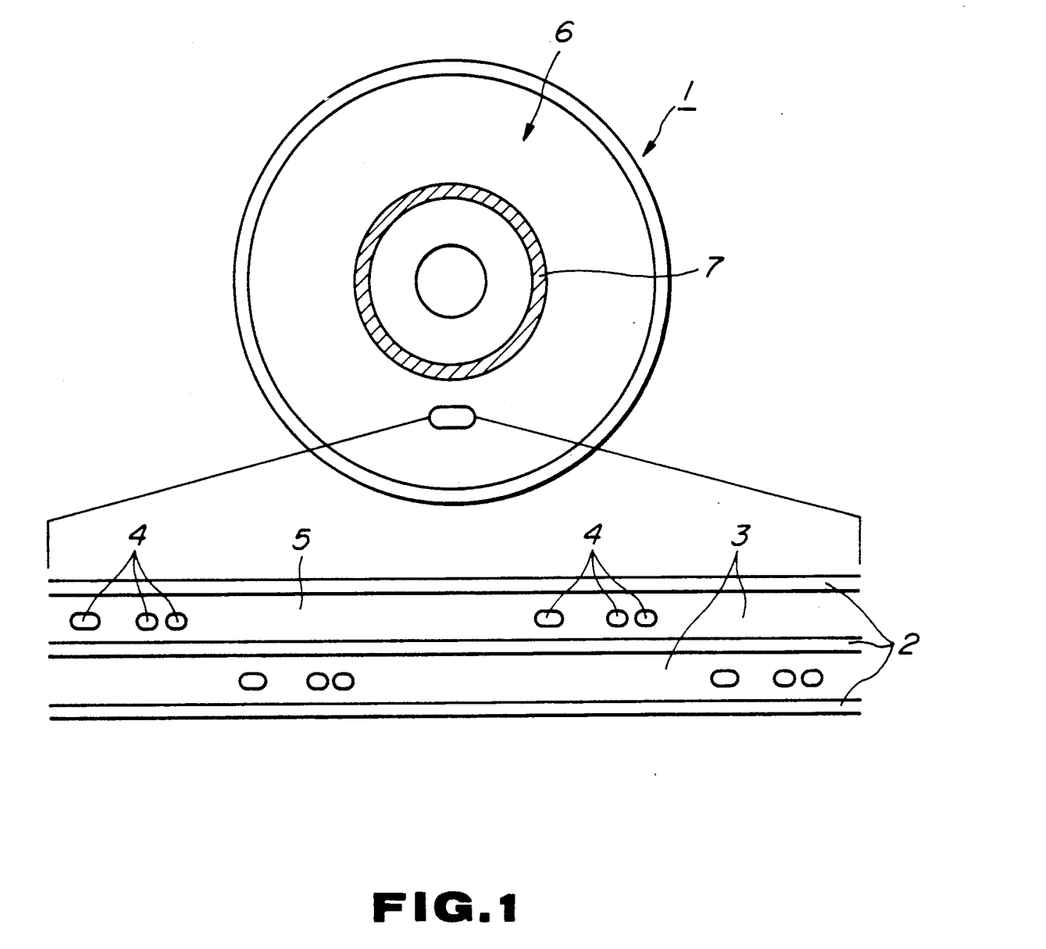
FIG. 1 is a diagrammatic view for illustrating a recording format of a recordable disk employed in an embodiment of the present invention.
Figure 2:
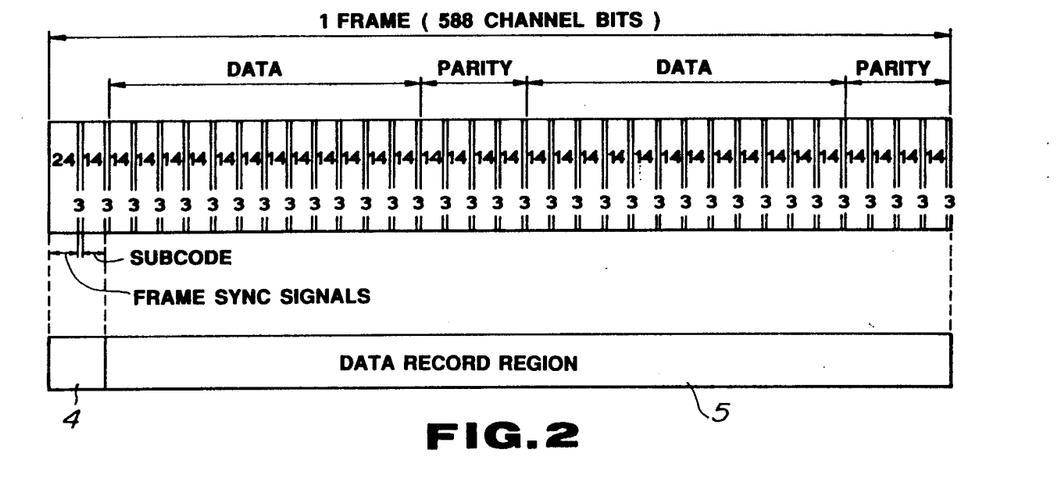
FIG. 2 is a diagrammatic view showing a data format of the information recorded on the recordable disk.
Figure 3:
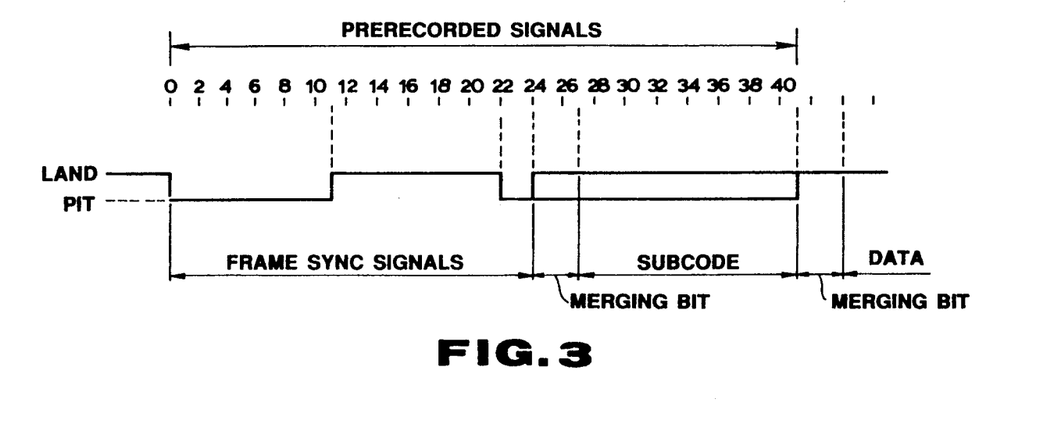
FIG. 3 is a diagrammatic view showing a constructional example of a pattern of projections and recesses formed in a prerecorded region.

As shown diagrammatically in FIG. 1, the recordable disk 1 employed in the above disk system is formed with spirally extending pregrooves 2 having a depth equal to $\lambda/8$, wherein $\lambda$ indicates the wavelength of the laser beam used for information recording. On a land 3 between the adjacent pregrooves 2, a prerecorded region 4 in which patterns of projections and recesses formed by pits each $\lambda/4$ deep are previously recorded and a data recording region 5 in which magneto-optical recording is performed, are formed alternately in the circumferential direction, each at an equal pitch. A lead-in region 7 is provided at the inner periphery of the program region 6 in which the performance information is recorded. In this lead-in region, there is recorded TOC or table of contents information indicating the record contents of the program region 6. In the prerecorded region 4 of the recordable disk 1, there are recorded 24 bits of sync signals and 14 bits or 1 symbol of subcode as patterns of projections and recesses formed in advance by a molding operation as indicated in FIG. 3. These subcodes represent the absolute time information or absolute addresses from the start position of the program region 6. The above 24 bit sync signals and 14 bit subcodes are a part of the 588 channel bit data making up one frame of the data format, as shown in FIG. 2, standardized for the compact disk (CD), and including, in addition to the above sync signals and subcodes, $14 \times 32$ bits (32 symbols) of the data such as the performance information and parities and margin bits, each of 3 bits, provided between adjacent symbols.

In a disk system employing the above described recordable disk 1, disk rotation control etc. is performed at a constant linear velocity (CLV), utilizing the aforementioned absolute addresses reproduced from the prerecorded region 4 of the recordable disk 1, so that the information is recorded in the data format standardized for the compact disk (CD).

It will be noted that, in the disk system employing the recordable disk, such as the magneto-optical disk formed by the magneto-optical recording medium, when a track jump takes place, that is, when the scanning beam from an optical head jumps from a presently recorded track or current track to another track due to vibrations caused during the recording operation or disk defects, the recorded performance information may be discontinuous or become discrete as a function of the amount of such track jump, such that the performance may be interrupted depending on the amount of the track jump during reproduction and, in the worst case, a performance information is over-written on the previously recorded track to destroy the previously recorded performance information.

It is therefore an object of the present invention to provide a disk recording apparatus of a novel construction in which a track jump is detected during the recording operation and the mistaken recording of the information on the tracks other than the target track is avoided.

DISCLOSURE OF THE INVENTION

For accomplishing the above object, the present invention provides a disk recording apparatus in which the information is recorded on a recordable disk on which absolute addresses have been recorded in advance, said device comprising detecting means for detecting that a scanning beam from an optical head has jumped from a current track to another track during the recording operation and counting means for counting clocks synchronized with the absolute addresses periodically reproduced from said recordable disk, wherein the laser power of the optical head is lowered to establish a reproduction mode by signals indicating that said detecting means has detected a track jump of said scanning beam from said current track to said another track, said laser power being raised for reverting to the recording mode after said scanning beam is accessed to the address position indicated by the count value of said counting means.

According to the present invention, the values of the absolute addresses reproduced from the recordable disk are preset in the interpolation counter to start the recording operation. On occurrence of a track jump due to, for example, vibrations or disk defects, in the course of the recording operation, the laser power of the optical head is lowered to the reproduction level and the track jump control is performed so that the value of the absolute address reproduced from the disk coincides with the count value of the interpolation counter so that the recording operation is resumed at the target track. Thus there is but little risk that discontinuity will be introduced into the data on the disk to interrupt the performance, or that the prerecorded performance information will be destroyed, so that a stable recording operation is assured.

BEST MODE FOR PRACTICING THE INVENTION

In the following embodiment, the present invention is applied to a disk recording/reproducing device in which a magneto-optical disk having a perpendicular magnetizing film exhibiting magneto-optical effects is used as a recordable disk 1 having the above described recording format shown in FIG. 1, and in which the recordable disk 1 is driven into rotation at a constant linear velocity (CLV) for recording and/or reproducing performance information having the data format shown in FIG. 2.

Figure 4:
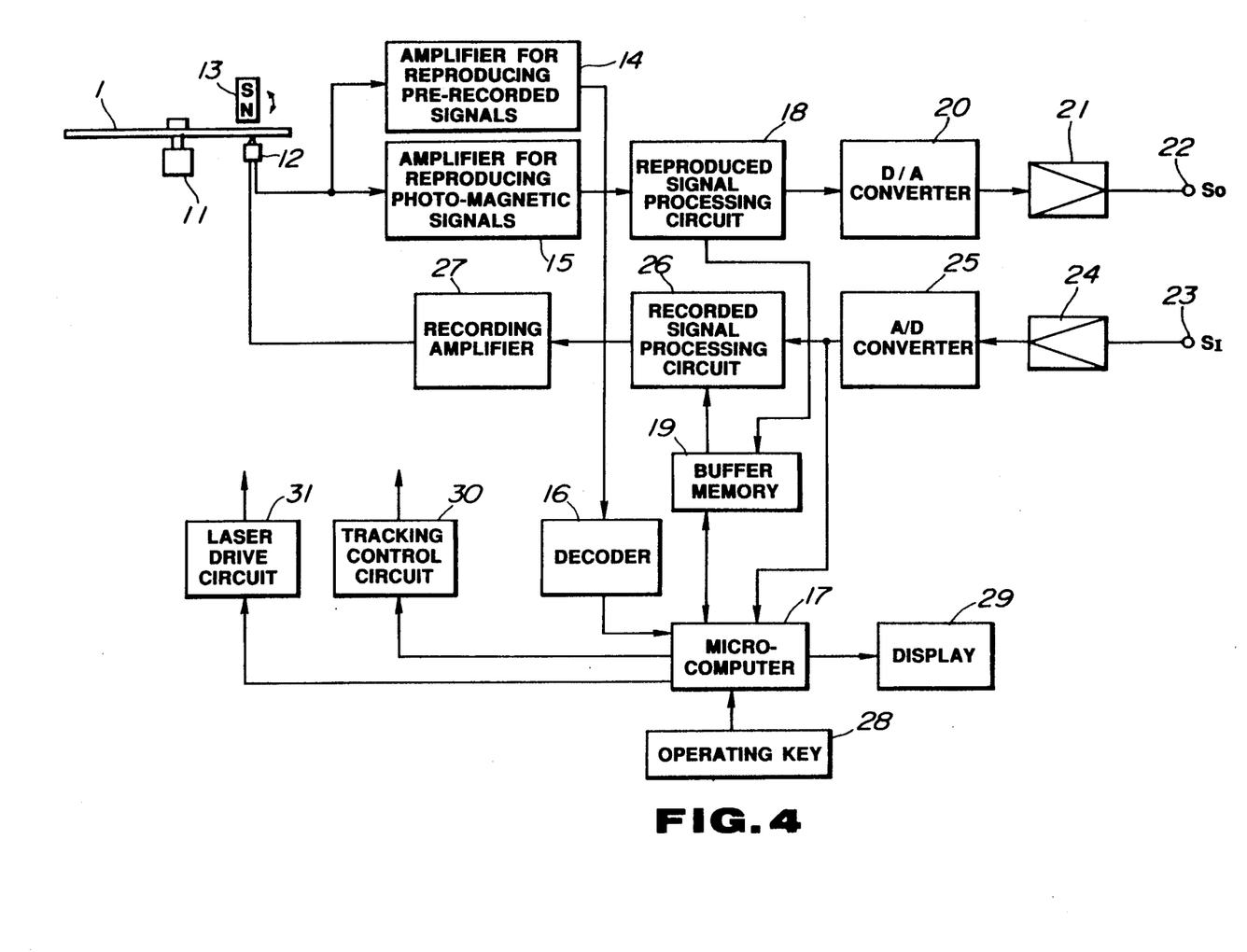
FIG. 4 is a block diagram showing a diagrammatic construction of an embodiment in which the present invention is applied to a disk recording/reproducing device.

Referring to the block diagram of FIG. 4, the disk recording/reproducing device includes an optical head 12 and a magnet 13, provided for facing each other on opposing sides of a recordable disk 1 driven rotatably by a disk motor 11. The optical head 12 is connected to an amplifier for reproducing pre-recorded signals 14 and to an amplifier for reproducing photo-magnetic signals, while also being connected to a recording amplifier 27.

The optical head 12 is composed of optical components, such as a laser diode, photo-detector, lens or a beam splitter and performs the recording and/or reproduction of information by irradiating the recordable disk 1 with a laser beam. The magnet 13 affords a magnetic field for recording or erasing the information on or from the recordable disk, by taking advantage of photo-magnetic effects. The orientation of the magnetic poles of the magnet is inverted at the time of shifting from the recording to the erasure modes and vice versa.

The optical head 12 and the magnet 13 are adapted to be moved along a radius of the disk 1 by a feed system, not shown, driven by a tracking control circuit 30. A laser diode, not shown, of the optical head 12 emits a laser light having a power proportionate to the drive current supplied from a laser drive circuit 31.

Among the reproduced RF signals read out from the recordable disk 1 by the optical head 11, the reproduced signals from the prerecorded region 4 are transmitted by way of the amplifier for reproducing prerecorded signals 14 to a decoder 16. The absolute address data decoded by the decoder 16 are supplied to a micro-computer 17. The reproduced signals reproduced from a data recording region 5 on the recordable disk 1 are transmitted by way of the amplifier for reproducing photo-magnetic signals 15 to a reproduced signal processing circuit 18 so as to be subjected to a predetermined signal processing operation. The performance information reproduced from the program region 6 of the recordable disk 1 is transmitted by way of the reproduced signal processing circuit 18 to a digital to analog (D/A) converter 20 where it is converted into analog form to be outputted at a signal output terminal 22 by way of a buffer amplifier 21 as a reproduced voice or audio signal So. The TOC information reproduced from the lead-in region 7 of the recordable disk 1 is transmitted from the reproduced signal processing circuit 18 to a TOC buffer memory 19 where it is stored.

In the above described disk recording/reproducing apparatus, the voice or audio signals Si to be recorded in the program region 6 of the recordable disk 1 are transmitted from a signal input terminal 23 by way of a buffer amplifier 24 to an analog to digital (A/D) converter 25 where they are digitized. The performance information digitized at the A/D converter 25 is subjected to a prescribed signal processing at a recording signal processing circuit 26, after which it is transmitted by way of the recording amplifier 27 to the optical head 12 so as to be recorded in the program region 6 of the recordable disk 1.

The output of the A/D converter is also transmitted to the micro-computer 17. To this micro-computer 17 are connected an operating key 28 for inputting control data and a display 29 for displaying various data.

Figure 5:
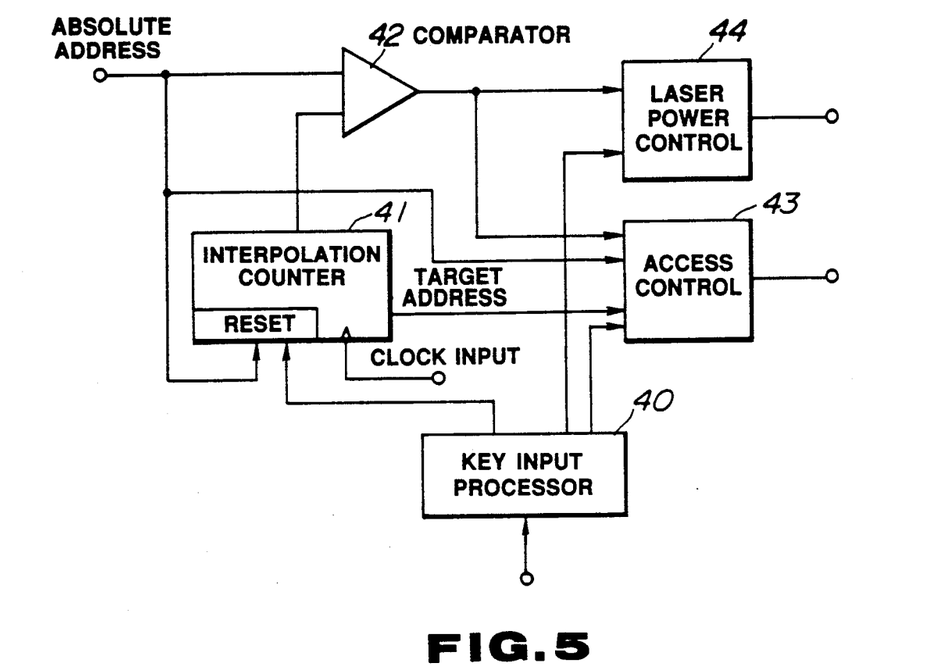
FIG. 5 is a block diagram diagrammatically showing a functional construction of essential parts of a micro-computer provided in the disk recording/reproducing device.

The micro-computer 17 has its essential functional construction shown in the block diagram of FIG. 5 and is composed of a key input processor 40, an interpolation counter 41, an address comparator 42, an access control 43 and a laser power control 44. The key input processor 40 monitors the operating state of the operating key 28, acknowledges the input of control data and transmits control signals to the interpolation counter 41, access control 43 and the laser power control 44. To the interpolation counter 41 are supplied absolute address data obtained at the decoder 16. At the start of the recording operation, the value of the absolute address data is preset by control signals transmitted from the key input processor 40 to start the count operation of the interpolation clock. The address data obtained as the result of counting are transmitted to the address comparator 42 and the access control 43. To the address comparator 42 are transmitted the absolute address data obtained at the decoder 16. The comparator 42 compares the value of the absolute address data with the value of the address data supplied from the interpolation counter 41 and transmits a comparison output, which is at a logical "1" in case of non-coincidence between these values, to the access control 43 and to the laser power control 44. The access control 43 operates responsive to control signals supplied from the key input processor 40, interpolation counter 41 and the address comparator 42 to produce tracking control signals which are transmitted to the tracking control circuit 30. The laser power control 44 is responsive to control signals transmitted from the key input processor 40 and the address comparator 42 to produce laser power control signals which are transmitted to the laser drive circuit 31.

Figure 6:
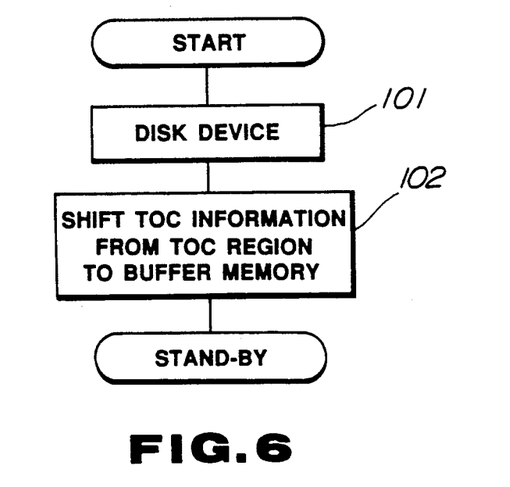
FIG. 6 is a flow chart for illustrating the operation of the setup mode of the disk recording/reproducing device.

As shown in the flow chart of FIG. 6, when the recordable disk 1 is mounted in position, at the start of the operation, the disk recording/reproducing device operates so that the TOC information recorded in the lead-in region 7 of the recordable disk 1 is read at the optical head 12 and stored in the buffer memory 19 at steps 101 and 102. The device is then at a stand-still state. Referring to the flow chart of FIG. 7, when the record mode is designated by the operation of the key 28 in the stand-by state, the microcomputer 17 sets the record mode at step 201 and reproduces the absolute address data at step 202 from the prerecorded region 4 of the recordable disk 1 at the time of initiation of the recording operation. The micro-computer 17 then presets the value of the absolute address data in the interpolation counter 41 at step 203. It is then decided by the address comparator 42 at step 205 whether the value of the absolute address data (ADR) reproduced from the prerecorded region 4 coincides with the value of the address data (CNT) from the interpolation counter 41. If the result of decision is YES, that is, if the two values coincide with each other, recording is performed at step 206. It is then decided at step 207 whether the end of the recording operation is designated. If the result of decision at step 207 is NO, that is, if the recording operation is to be continued, the absolute address data reproduced from the prerecorded region 4 are reproduced at step 204. The program then reverts to the decision operation at step 205 to perform the recording operation at step 206 repeatedly. If the result of decision at step 207 is YES, that is, if the end of the recording operation is designated, the recording/reproducing device proceeds to the stand-by state.

Figure 7:
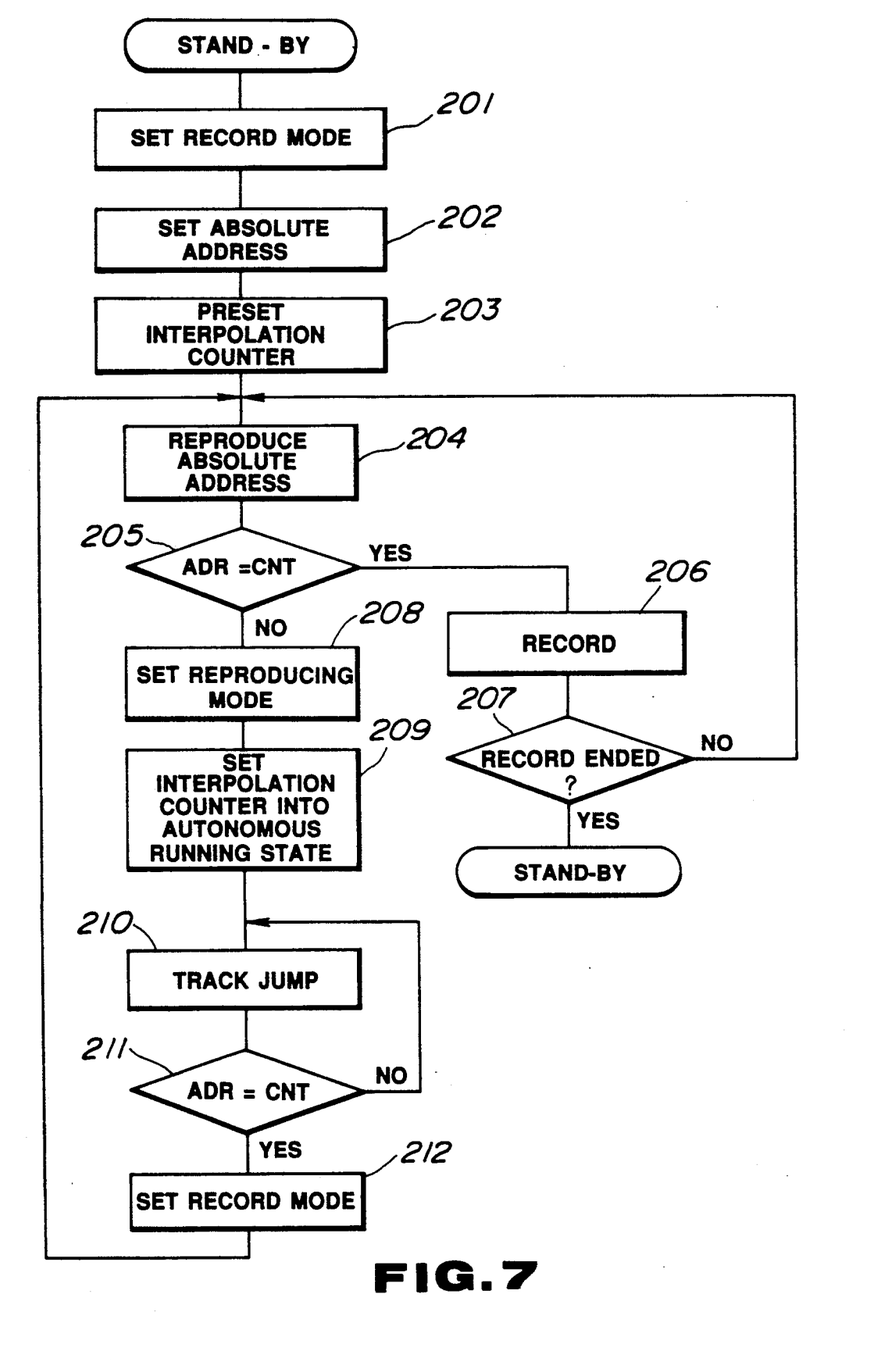
FIG. 7 is a flow chart illustrating the operation of the recording mode.

If the result of decision at step 205 is NO, that is, when the value of the absolute address data (ADR) reproduced from the prerecorded region 4 and the value of the absolute address data (CNT) from the interpolation counter 41 are not coincident with each other, which means that the scanning beam from the optical head 12 has undergone track jumping from a current track to some other track, the reproducing mode is set at step 208 at once and the laser power of the optical head 12 is dropped to the reproduction level to establish the reproducing mode. As the interpolation counter 41 is caused to run autonomously at step 209, access is made at step 210 by track jumping, with the address data from the interpolation counter 41 as the target value, whilst it is decided at step 211 whether the value of the absolute address data (ADR) reproduced from the prerecorded region 4 coincides with the value of the address data (CNT) from the interpolation counter. It is noted that access by track jumping at step 210 is made by a fine tracking control achieved by supplying a drive current to an object lens or to a tracking mirror. If the result of the decision at step 211 is NO, the access by track jumping at step 211 is repeated until the result of decision becomes YES. When the decisional result becomes YES, the recording mode is set at step 212 and the absolute address data are reproduced from the prerecorded region 4 at step 204. The program then proceeds to the decision step 205 to determine whether to perform recording at step 206. The recording operation at step 206 is repeated until the result of the decision at step 207 becomes YES. The device proceeds to the stand-by state when the recording operation is terminated.

Figure 8:
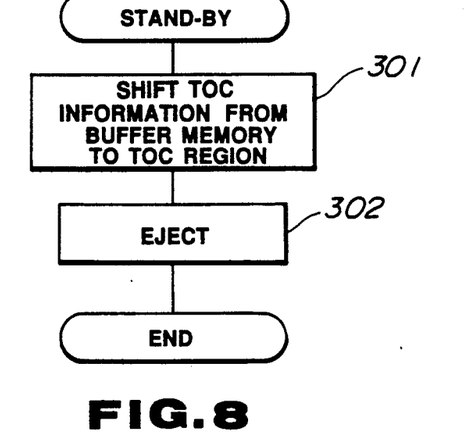
FIG. 8 is a flow chart illustrating the ejection mode.

When the eject mode is designated by the operation of the key 28 in the above standby state, the disk recording/reproducing device records the TOC information stored in the TOC buffer memory 19 at step 301 in the lead-in region 7 of the recordable disk 1 by the optical head 12. The eject operation is then performed at step 302 to terminate the operation.

It is noted that the functional construction of the micro-computer 17 is not limited to the construction of the block diagram shown in FIG. 5. For example, as shown in the block diagram of FIG. 9, the micro-computer 17 may be formed by a latch circuit 51, addition circuit 52, first and second address comparators 53 and 54, interpolation counter 55, key input processor 56, access control 57 and a laser power control 58.

Figure 9:
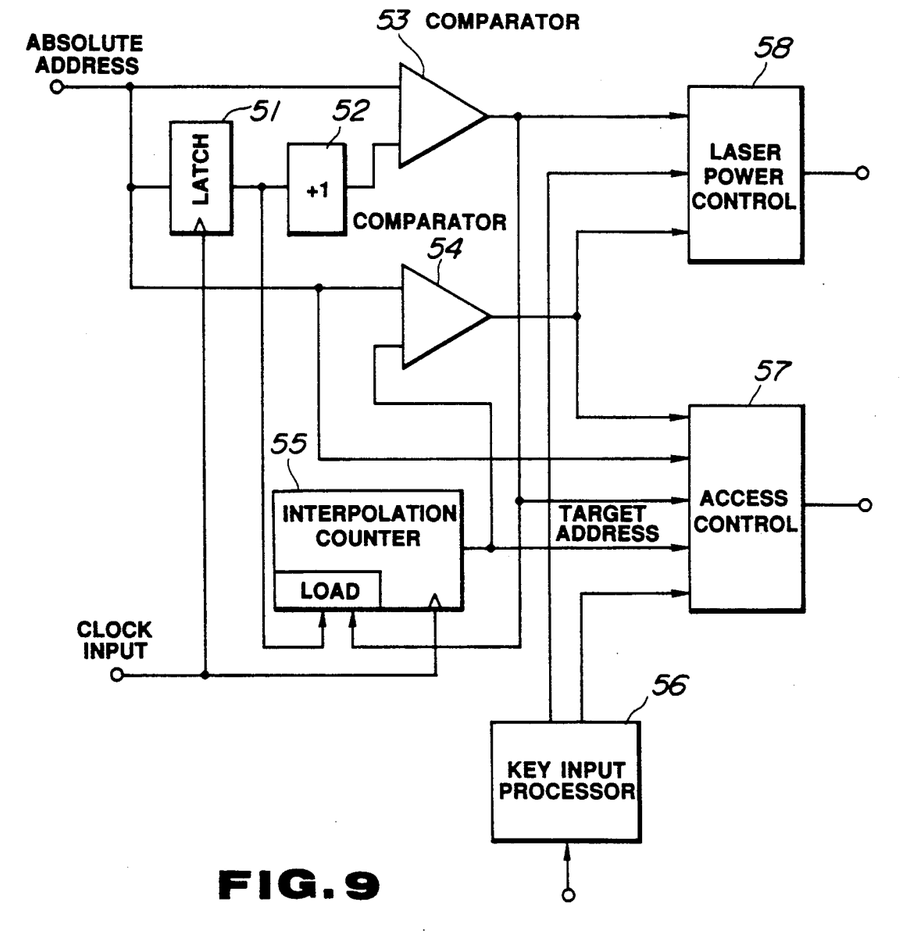
FIG. 9 is a block diagram diagrammatically showing an example of the functional construction of other essential parts of the micro-computer.

In this case, the absolute address data obtained at the decoder 16 are transmitted to the latch circuit 51 and each of the address comparators 53 and 54.

The absolute address data are latched at the latch circuit 51 by clock inputs synchronized with the absolute address data, with the latch output being supplied to the addition circuit 52 while also being supplied as the load data to the interpolation counter 55. The addition circuit 52 performs an operation of adding "1" to the absolute address data latched at the latch circuit 51, with the addition output being supplied to the first address comparator 53. The first address comparator 53 compares the value of the current absolute address data obtained at the decoder 16 with the value of the absolute address data latched at the latch circuit at the immediately preceding latching operation plus the value of the address data added to by "1" at the addition circuit 52. A comparison output which is at logic level "1" when the two values are not coincident with each other is supplied to the access control 57 and to the laser power control 58, at the same time that the comparison output is supplied as the load and count start instructions to the interpolation counter 55. When the comparison output from the first address comparator 53 is at logic level "1", the absolute address data latched at the latch circuit 51 are loaded at the same time in the interpolation counter 55, which then proceeds to count of the clock inputs synchronized with the absolute address data, starting from the loaded absolute address data, with the count output being supplied as the target address data to the second address comparator 54 and the access control 57. The second address comparator 54 compares the value of the current absolute address data obtained at the decoder 16 with the value of the target address data supplied from the interpolation counter 55 and transmits a comparison output, which is at logic level "1" when the values are not coincident with each other, to the access control 57 and to the laser power control 58. The operating modes for the access control 57 and the laser power control 58 are designated by control signals from the key input processor 56. In the normal operating state in which both comparison outputs of the first and second address comparators 53 and 54 become logic level "0", the access control 57 performs an access with a reference being made to the current absolute address data obtained at the decoder 16. When an incorrect track jump occurs in the course of the recording operation such that the comparison output of the first address comparator 53 is at logic level "1", the access control 57 performs an access with a reference being made to the target address data supplied from the interpolation counter 55. When the comparison output of the first address comparator 53 is at logic level "1", the laser power control 58 causes the laser power to drop compulsorily to the reproduction level, despite the fact that the recording mode is designated by the control signal supplied from the key input processor 56. The access by track jumping is performed in the reproduction mode, with the access by the track jumps being repeated until the value of the current absolute address data produced at the decoder 16 coincides with the value of the target address data obtained at the interpolation counter 55, so that the comparison output of the second address comparator 54 is at logic level "0". When the value of the absolute address data obtained at the decoder 16 and the value of the target address data obtained at the interpolation counter 55 coincide with each other, as a result of the aforementioned access performed by track jumping in the reproduction mode, at the same time that the comparison output of the first address comparator 53 is also at logic level "0", the laser power control 58 causes the laser power to be increased to the original value for reversion to the recording mode.

I claim:

1. In a disk recording apparatus for recording information by projecting a laser beam having an adjustable power level on a predetermined one of a plurality of tracks in an optically recordable disk on which absolute addresses have been recorded in advance, said disk recording apparatus being operative to read said absolute addresses indicative of a position of said laser beam on said optically recordable disk; a system for re-establishing a recording mode at a desired recording position in said predetermined one of said plurality of tracks of said laser beam after the occurrence of an undesired track jump of said laser beam, comprising:

detecting means for detecting an undesired track jump of said laser beam from said predetermined one of said plurality of tracks to another track during a recording operation;

address counting means for maintaining a current address in said predetermined one of said plurality of tracks after the occurrence of said undesired track jump by counting clock signals synchronized with the absolute addresses read by said disk recording apparatus indicating a current address of said laser beam;

first power adjusting means for adjusting the power level of said laser beam to a non-recording level upon the detection of said undesired track jump by said detecting means;

repositioning means for repositioning said laser beam to a different track of said optically recordable disk after said undesired track jump;

comparing means for comparing the absolute addresses read by the disk recording apparatus from said different track of said optically recordable disk with said current address maintained by said address counting means to detect coincidence thereof; and second power adjusting means for increasing the adjustable power level of the laser beam to a recording level after detection of coincidence of one of said absolute addresses and said current address by said comparing means.

2. A disk recording apparatus according to claim 1, wherein said address counting means is presettable with an absolute address reproduced by said disk recording apparatus from said optically recordable disk upon the initiation of a recording operation.

3. A disk recording apparatus according to claim 1, further comprising means for storing an absolute address previously reproduced by said disk recording apparatus; and means for loading said absolute address as said current address in said address counting means upon detection of an undesired track jump by said detecting means.

4. A disk recording apparatus according to claim 1, wherein said repositioning means is operative to reposition the laser beam to a different track by track jumping.

* * * * *